United States Patent
Park et al.

(10) Patent No.: US 6,442,152 B1
(45) Date of Patent: Aug. 27, 2002

(54) DEVICE AND METHOD FOR COMMUNICATING PACKET DATA IN MOBILE COMMUNICATION SYSTEM

(75) Inventors: Su-Won Park; Jin-Soo Park; Soon-Young Yoon; Jae-Min Ahn; Young-Ky Kim; Doo-Gyun Kim, all of Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/352,531

(22) Filed: Jul. 13, 1999

(30) Foreign Application Priority Data

Jul. 13, 1998 (KR) .............................. 98-28237
Jul. 15, 1998 (KR) .............................. 98-29180

(51) Int. Cl.$^7$ .................... H04B 7/216; H04Q 7/28; H04Q 7/20
(52) U.S. Cl. .................... 370/341; 370/320; 370/335; 370/342; 455/450
(58) Field of Search ................. 370/441, 442, 370/320, 335, 350; 375/130, 132, 134, 140, 146, 147, 149

(56) References Cited

U.S. PATENT DOCUMENTS

| | | | |
|---|---|---|---|
| 5,673,259 A | * | 9/1997 | Quick, Jr. .................... 370/342 |
| 6,195,546 B1 | * | 2/2001 | Leung et al. ................ 455/419 |
| 6,266,331 B1 | * | 7/2001 | Baker et al. ................ 370/335 |

* cited by examiner

Primary Examiner—Edward F. Urban
Assistant Examiner—Meless Zewdu
(74) Attorney, Agent, or Firm—Dilworth & Barrese, LLP

(57) ABSTRACT

Packet data communicating device and method in a CDMA communication system. According to a first embodiment, a transmitting device for a base station includes a data generator for generating frame data to be transmitted, a first mask generator for generating a long code mask for a forward common channel, a second mask generator for generating a long code mask for a forward common channel to be designated as dedicated to a specific mobile station, a selector for selecting one of the long code masks generated in the first and second mask generators, a long code generator for generating a long code with the selected long code mask, a scrambler for mixing the frame data received from the data generator and the long code received from the long code generator, and a transmitter for spreading the scrambled frame data, for transmission.

3 Claims, 13 Drawing Sheets

DEVICE AND METHOD FOR COMMUNICATING PACKET DATA IN MOBILE COMMUNICATION SYSTEM

CLAIM OF PRIORITY

This application makes reference to, incorporates the same herein, and claims all benefits accruing under 35 U.S.C. §119 from an application entitled DEVICE AND METHOD FOR COMMUNICATING PACKET DATA IN MOBILE COMMUNICATION SYSTEM earlier filed in the Korean Industrial Property Office on Jul. 13, 1998, and there duly assigned Serial No. 98-28237 and also Korean Patent Application Serial No. 1998-29180.

BACKGROUND OF THE INVENTION

1. Field of the Invention

The present invention relates to a device and method for communicating packet data in a mobile communication system, and more particularly, to a device and method used for rapidly assigning a dedicated channel for packet data service in a CDMA (Code Division Multiple Access) mobile communication system.

2. Description of the Related Art

In CDMA mobile communication systems, the IMT-2000 standard has evolved from the IS-95 standard. IS-95 supports voice service only, whereas IMT-2000 enables high-quality voice service, transmission of moving pictures, and internet browsing.

Data communication in the mobile communication system is characterized by a momentary active state and a long idle state. Accordingly, the next generation of mobile communication systems assign a dedicated channel in a data communication service only at the time when data is transmitted. That is, dedicated traffic and control channels are connected during data transmission and released after a predetermined time when no data is transmitted, due to limited radio resources, base station (BS) capacity, and mobile power consumption. Once the dedicated channels have been released, communication is made via common channels, thereby increasing use efficiency of the radio resources.

To do so, packet service is implemented in many state, depending on channel assignment and the presence or absence of state information. FIG. 6 is a state transition diagram for packet service in a communication system. Referring to FIG. 6, the packet service is comprised of a packet null state, an initialization state, an active state, a control hold state, a suspended state, a dormant state, and a reconnect state. Packet service options are connected in the control hold state, active state, and suspended state.

Upon request for packet service in the packet null state, the initialization state is entered where a connection attempt for packet service is performed, and transition to the control hold state occurs if a dedicated control channel is established. The dedicated control channel is needed to transmit a layer 3 (L3) message and a medium access control (MAC) message. Then, upon entering the active state, forward and reverse dedicated control channels and traffic channels are maintained with RLP (Radio Link Protocol) frames being communicated on these channels. If a relatively short inactive time period is set, the suspended state is entered to efficiently use radio resources and conserve mobile station (MS) power. In the suspended state, the dedicated control and traffic channels are released but can be re-assigned in a relatively short time because both the BS and the MS retain status information including RLP initialization, traffic channel assignment, and encryption variables. If there is no data exchanged for a predetermined time, the suspended state transitions to the dormant state. In the dormant state, only a PPP (Point-to-Point Protocol) connection is maintained and if transmit data is generated, a reconnect state is entered. If the dedicated control channel is established, the reconnect state transitions to the control hold state. While the MS and the BS are in a common channel state, such as the suspended, dormant, and reconnect states, the MS monitors a paging channel and a common control channel on a forward link, and the BS monitors an access channel and a common control channel on a reverse link. There may be a plurality of paging channels and access channels. Each paging channel is distinguished by a different Walsh code and each access channel is distinguished by a different long code.

In FIG. 6, after the active state transitions to the suspended state through the control hold state in the absence of data for a predetermined time during a data communication, messages are exchanged on common channels. Upon generation of a control message for resuming data transmission, the BS attempts to connect to the MS on a paging channel and then the MS transmits a response message on an access channel. However, this common channel message transmission is susceptible to message contention if other MSs use the same access channel, resulting in a reception failure in the BS. If each MS fails to receive an acknowledgement from the BS within a predetermined time, it perceives the occurrence of message contention and resumes a message transmission after a randomized time delay. If repeated attempts to access the access channel for predetermined times fail, the procedure starts again. Information is transmitted on the access channel in access channel slots.

In the mechanism of transmitting an access channel message, the entire process of sending one message and receiving (or failing to receive) an acknowledgement for that message is called an access attempt. Each transmission in the access attempt is called an access probe. Each access probe consists of an access channel preamble and an access channel message capsule. When a message contention occurs, an access probe is re-transmitted with a power level set at a specified amount higher than the previous access probe's power level after a randomized time delay.

In the case of the MSs initiation of data communication, the same message transmission procedure is performed without the paging step of the BS. If an access channel message is too long to be sent at one time, it is divided into appropriate segments prior to transmission and the above procedure for each segment.

After exchanging the common channel messages, the BS assigns a dedicated code channel and sends a traffic channel assignment message on the dedicated channel. When the BS responds to the message, user data is sent on a dedicated traffic channel.

The procedure of assigning the dedicated channel is implemented in the same manner during transitions from the suspended state to the active state and from the dormant state to the active state. Transition from the suspended state to the active state requires service option negotiation associated with radio resources assignment and RLP initialization because only PPP information is reserved and no radio resources-related information exists in the dormant state.

FIG. 1 describes a conventional data service resuming procedure for a call initiated by a BS in a dormant state. A BS 112 sends a forward control message for resuming a data service to a corresponding addressed MS 114 on a paging channel (F-PCH) being a forward common channel (step 120). Then, the MS 114 sends a response message for the control message on a reverse access channel (R-ACH) (step 122). On the reverse access channel, a preamble precedes an access channel message to facilitate acquisition of a reverse physical channel in the BS 112 (step 126).

The entire process of sending one message and receiving (or failing to receive) an acknowledgement for that message is called an access attempt. Each transmission in the access attempt is called an access probe. Each access probe is comprised of a preamble and a message capsule. Upon contention of access probes, the mobile station transmits an access probe at a progressively higher power level than the previous access probe after a randomized delay. Here, transmission of the preamble is transmitted on a reverse pilot channel to synchronize timing between the BS and the MS which had a communication interrupted.

Reverse access channels share a long code. In a long code sharing scheme, an MS uses a Hash function to determine a long code among all available long codes (access channel long codes) in its initialization state, so that all MSs fairly share the long codes for access channels. A reverse pilot channel for channel estimation is spread by the long code of a reverse access channel and transmitted in parallel with the reverse access channel only for a time period when the reverse channel message exists. The two channels are distinguished by different orthogonal codes.

The preamble is transmitted on the reverse pilot channel at a higher transmit power level than the pilot channel, accompanied by a reverse access channel message. That is, the preamble is a segment of the pilot channel, with a relatively high transmit power.

If the BS 112 succeeds in synchronization with a reverse link and receiving the access channel message (step 126), it sends a dedicated channel assignment message on a forward common control channel (F-CCCH) (step 130) and null traffic on a forward dedicated control channel (F-DCCH) (step 140). If the MS 114 confirms that the dedicated channel is properly assigned from an analysis of the null frame of the F-DCCH, it sends a preamble on its unique code channel (R-PICH) (step 142). The preamble is used to recover synchronization between the BS 112 and the MS 114 which have experienced a temporary call interruption, during the channel assignment.

Then, the BS 112 sends an acknowledgement on the F-DCCH and the MS 114 stops transmitting the preamble (step 150). Thus, the MS 114 is capable of sending a message on a dedicated channel. RLP is initialized for packet data service and service options are connected (step 160). Hence, the control hold state is entered, and if a supplemental channel is successfully assigned (step 170), the active state is entered where packet data is communicated (step 180).

Meanwhile, if the BS 112 initiates a call in the suspended state, the data service can be resumed without step 160 in the above procedure.

FIG. 2 depicts a conventional data service resuming procedure for an MS initiated call in a dormant state. This is the same as the procedure described in FIG. 1 except that the MS 114 sends a packet service origination message on an access channel (step 222). Upon reception of the message by the BS 112, the subsequent steps are performed as shown in FIG. 1.

In resuming a data service for an MS initiated call in a suspended state, step 160 can be omitted in the above procedure.

A conventional data service resuming procedure which exchanges messages on common channels as illustrated in FIGS. 1 and 2, has many disadvantages.

There is a limitation inherent in long code sharing. The equal assignment of available long codes for common channels to mobile stations makes it impossible to control an individual probability of access channel contention for each mobile station. In view of frequent state transitions in the packet data service, the time required for the preliminary process for data transmission including channel acquisition is longer than an actual data transmission time.

Additionally, in a communication on a common channel, the MS must send a message in a slot allocated to the MS, thereby incurring a transmission delay while awaiting the allocated slot.

Also, since a reverse pilot channel is activated only at the time when an access channel message or a reverse common channel message is transmitted, the BS should reacquire the PN sequence of the MS prior to transmission of a channel assignment message. Accordingly, the MS repeatedly performs an access attempt in which a preamble is sent at a relatively high transmit power level, followed by an access channel message. Therefore, power is excessively consumed and the BS reacquisition step is added.

Finally, data can be transmitted only through a regular state transition. In other words, if the amount of data to be transmitted at a time is small, the resources that a preliminary process for resuming data transmission takes is larger than that of actual data transmission, leading to inefficient use of resources.

In a conventional designation of a common channel, an MS transmits a message on a reverse access channel and receives a response for the message on a forward paging channel. Thus, there may exist a plurality of forward paging channels and reverse access channels. Each forward channel is distinguished by a different Walsh code and each reverse channel by a different long code in a CDMA mobile communication system.

Upon generation of a message to be transmitted, the MS sends the message together with a preamble to the BS on an available access channel at an appropriate power level, and awaits an acknowledgement from the BS. If a different MS selects the same access channel, message contention occurs. Then, the BS may fail to receive the MS initiated message for a predetermined time. If it does, the MS sends the same message again using a power level set at a specified amount higher than the previous message and awaits an acknowledgement.

In the conventional mechanism of sending access channels being reverse common channels, concurrent message transmissions from MSs with the same long code are likely to cause message contention, leading to message losses. This is called contention-based random access.

When message contention occurs, the MS perceives the message contention in a predetermined time and resumes a message transmission after a randomized time delay. The MS performs an initial attempt to access the BS at a predetermined power level. When it fails to receive an acknowledgement from the BS, it performs the next attempt using a power level set at a specified amount higher than the previous attempt. If repeated attempts to access the access channel for predetermined times fail, the procedure starts again. Information is transmitted on the access channel in access channel slots and access channel frames.

For an MS to transmit a message which is too long to be transmitted at one time, the message must be divided into appropriate segments which are sent a plurality of times. When other MSs attempt to transmit messages using the same long code, message contention occurs. In this case, a long delay is involved in transmitting the entire message on the access channel.

The message contention can be prevented by designating a channel assigned by a BS as dedicated to an MS for transmission of a common channel message. On the other hand, to designate a forward common channel as dedicated, the MS requests for channel continuously transmit a common channel message, and then the BS sends a response message which includes the ID of an available channel.

The present invention provides a method of transitioning from a dedicated channel released state to a data transmission state by rapidly assigning a dedicated channel.

SUMMARY OF THE INVENTION

An object of the present invention is to provide device and method for communicating packet data, in which data transmission on a common channel is minimized and a data transmission state using a dedicated channel, or a channel designated as dedicated, is rapidly entered in order to efficiently use resources and support rapid data service.

According to one aspect of the present invention, the above object can be achieved by providing a BS transmitting device in a mobile communication system. In the transmitting device, a data generator generates frame data to be transmitted, a first mask generator generates a long code generator for a forward common channel, a second mask generator generates a long code mask for a forward common channel to be designated as dedicated to a specific mobile station, a selector selects one of the long code masks generated in the first and second mask generators, a long code generator generates a long code by use of the selected long code mask, a scrambler mixes the frame data received from the data generator and the long code received from the long code generator, and a transmitter spreads the scrambled frame, for transmission.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
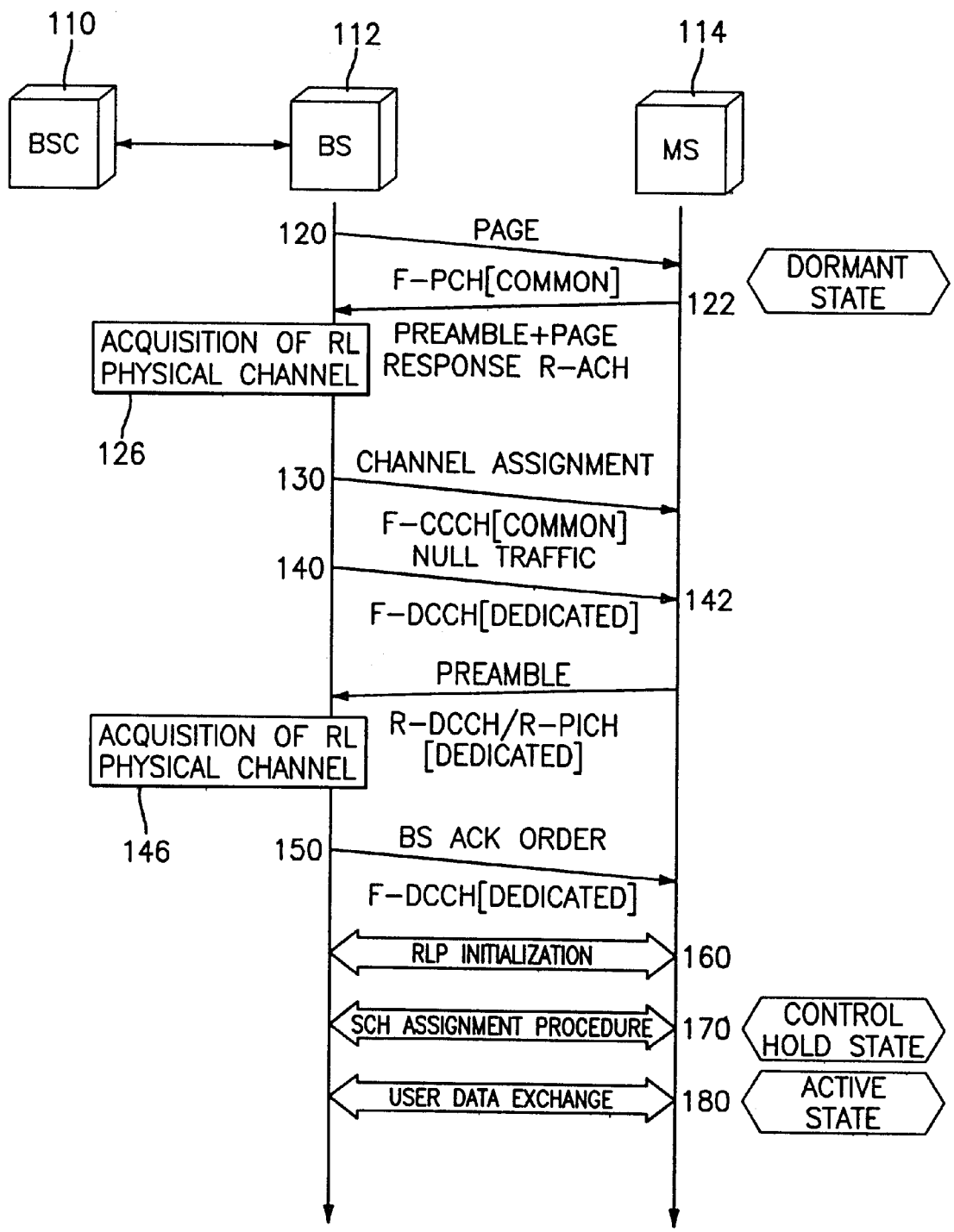
FIG. 1 is a flowchart depicting a conventional data service resuming procedure between a BS and an MS in a dormant state for call initiation by the BS.

A BSC (Base Station Controller) in the present invention is a controller disposed between a BS and an exchange or between a BS and an IWF (Inter-Working Function), for performing location registration of an MS, service connection, call management, and BS control.

Note that like reference numerals denote the same components or the same steps in the drawings, and a description of the present invention will be given, focussing on the difference between the prior art and the present invention. While the embodiments herein apply the present invention to a CDMA mobile communication system, the present invention is not limited to CDMA systems only.

Figure 7:
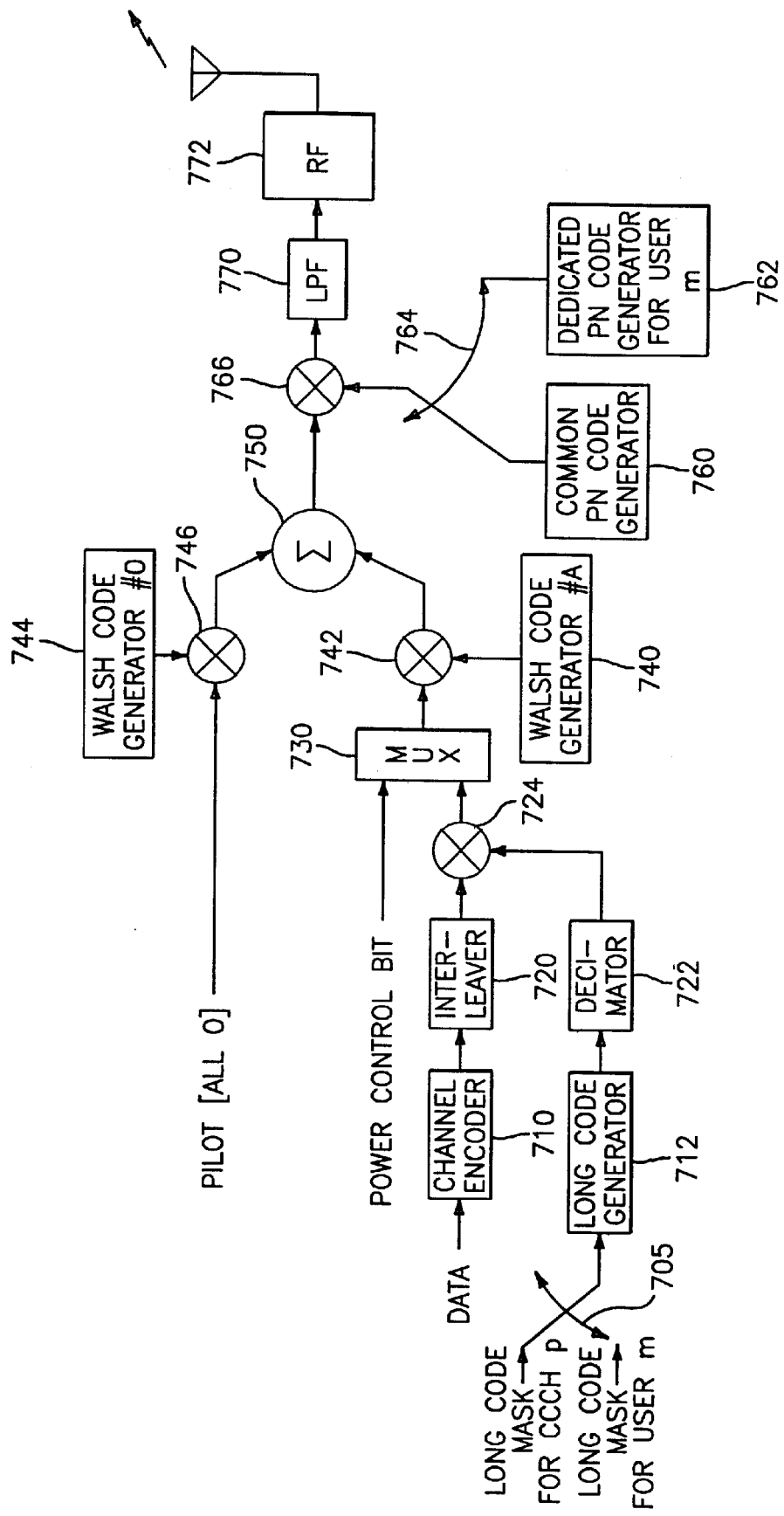
FIG. 7 is a block diagram of a transmitter in a BS according to the present invention.

FIG. 7 is a block diagram of a BS transmitting device according to an embodiment of the present invention. Referring to FIG. 7, a channel encoder 710 encodes data to transmit in a communication channel. An interleaver 720 randomizes encoded symbols for burst errors in the output of the channel encoder 710. A selector 705 selects a different long code mask according to a forward common channel and a forward dedicated channel. It selects a long code mask for a specific MS when a forward common channel is designated as dedicated upon request for the designation by the MS. The long code mask may be a specific long code mask used to designate a common channel as dedicated or a long code generated using an ESN (Electronic Serial Number) of the MS. A long code generator 712 generates a long code with the selected long code mask. A decimator 722 takes one chip from each predetermined chip of the long code to match a symbol rate at the output of the interleaver 720. A mixer 724 multiplies the outputs of the interleaver 720 and the decimator 722, for scrambling transmit information to allow only a receiver using the same long code mask to receive the information.

A multiplexer (MUX) 730 multiplexes the output of the mixer 724 and a power control bit sent to control the transmit power of an MS. The multiplexing can be implemented in two ways: time division multiplexing, and puncturing and power control bit insertion. The insertion location of the power control bit may be preset by a mobile communication system or randomly determined.

A Walsh code #A generator 740 is a type of orthogonal code generator for orthogonal channelization among forward channels and generates a Walsh code symbol #A of a Walsh code set. A mixer 742 multiplies the outputs of the multiplexer 730 and the Walsh code #A generator 740, for orthogonal modulation. A Walsh code #0 generator 744 generates a Walsh code symbol #0 for a pilot channel in the Walsh code set. A mixer 746 multiplies the output of the Walsh code #0 generator 744 by a predetermined value (+1 in the present invention) to produce a forward pilot channel for a receiver to use for channel estimation.

An adder 750 adds the outputs of the mixers 742 and 746. A common PN code generator 760 generates a PN sequence assigned to a cell to identify the cell. A dedicated PN code generator 762 for an MS "#m" generates a PN sequence for PN spreading a forward common channel to be designated as dedicated. As described above, the forward common channel can also be designated as dedicated with a specific long code mask. The dedicated PN code generator 762 can be separately procured or replaced by the long code generator 712 to implement the same function. A selector 764 selectively switches the outputs of the common PN code generator 760 and the dedicated PN code generator 762. A mixer 766 multiplies the sum of the forward channels received from the adder 750 by the selected PN sequence, for PN spreading. The output of the mixer 766 is transmitted through a low pass filter (LPF) 770, an RF (Radio Frequency) transmitting end 772, and a transmission antenna.

Figure 8:
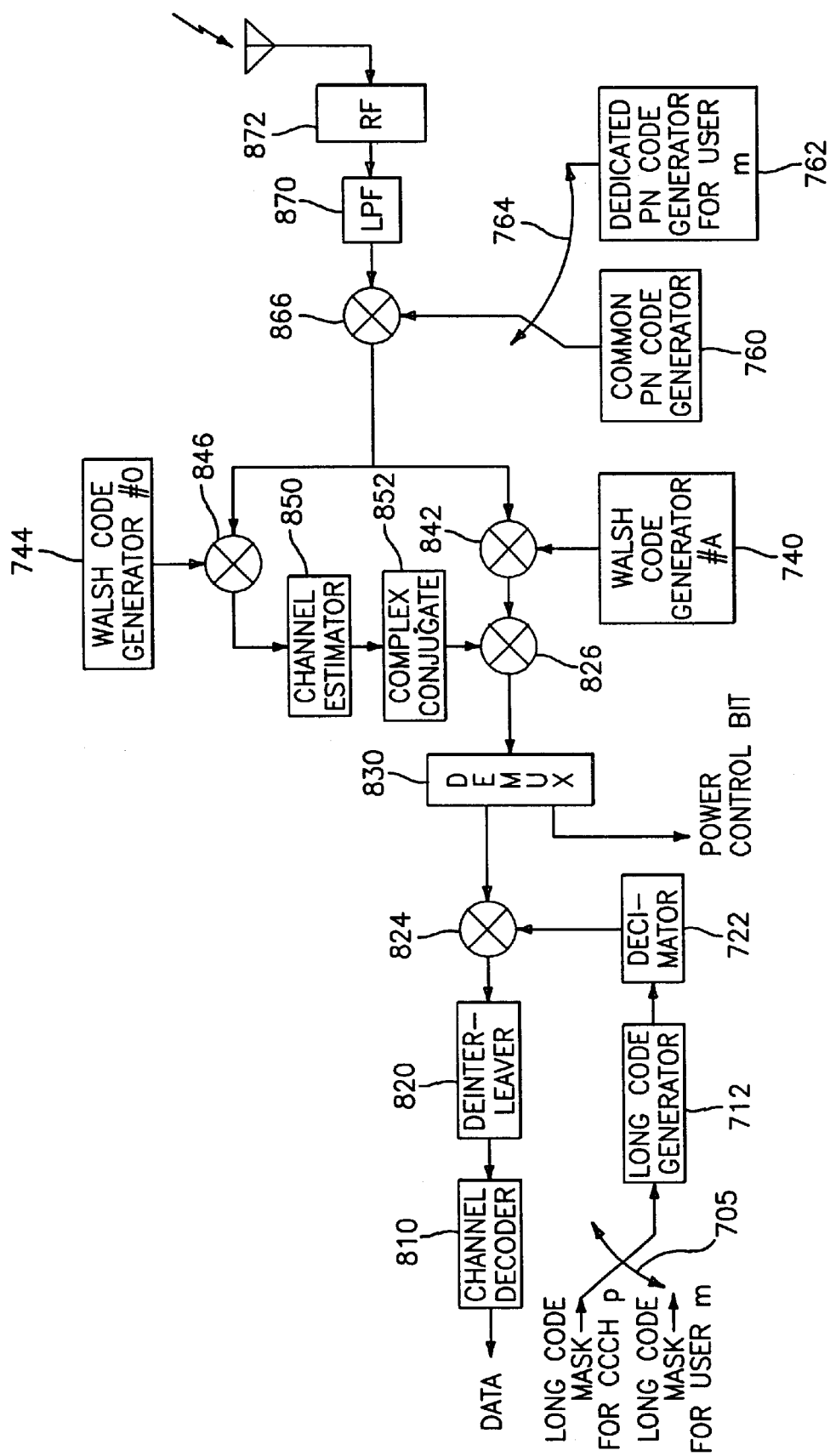
FIG. 8 is a block diagram of a receiver in an MS, corresponding to the transmitter of FIG. 7.

FIG. 8 is a block diagram of an MS receiver corresponding to the BS transmitter shown in FIG. 7. Referring to FIG. 8, a mixer 866 receives a signal through a reception antenna, an RF receiving end 872, and an LPF 870. The selector 764 selects the same PN sequence used in the BS transmitter between the outputs of the common PN code generator 760 and the dedicated PN code generator 762. The mixer 866 multiplies the selected PN sequence by the output of the LPF 870.

A mixer 846 multiplies the output of the mixer 866 by the output of the Walsh code #0 generator 744 in order to extract the pilot channel for channel estimation. A channel estimator 850 estimates a channel with the extracted pilot channel. A complex conjugator 852 produces the complex conjugate of the channel's estimated value. A mixer 842 multiplies the output of the mixer 866 by the Walsh code symbol #A used in the BS, thereby extracting the information transmitted to the MS. A mixer 826 multiplies the complex conjugate by the output of the mixer 842, for coherent demodulation. A demultiplexer (DEMUX) 830 demultiplexes the coherent demodulation signal into the power control bit and the data received from the BS.

The selector 705 selects the same long code mask that was used in the BS transmitter. The long code generator 712 generates a long code utilizing the selected long code mask. The decimator 722 takes one chip from each predetermined chip of the long code to match a symbol rate at the output of the demultiplexer 830. A mixer 824 multiplies the data separated by the demultiplexer 830 by the output of the decimator 722, for descrambling. A deinterleaver 820 deinterleaves the output of the mixer 824. A channel decoder 810 channel-decodes the deinterleaved signal.

Figure 9:
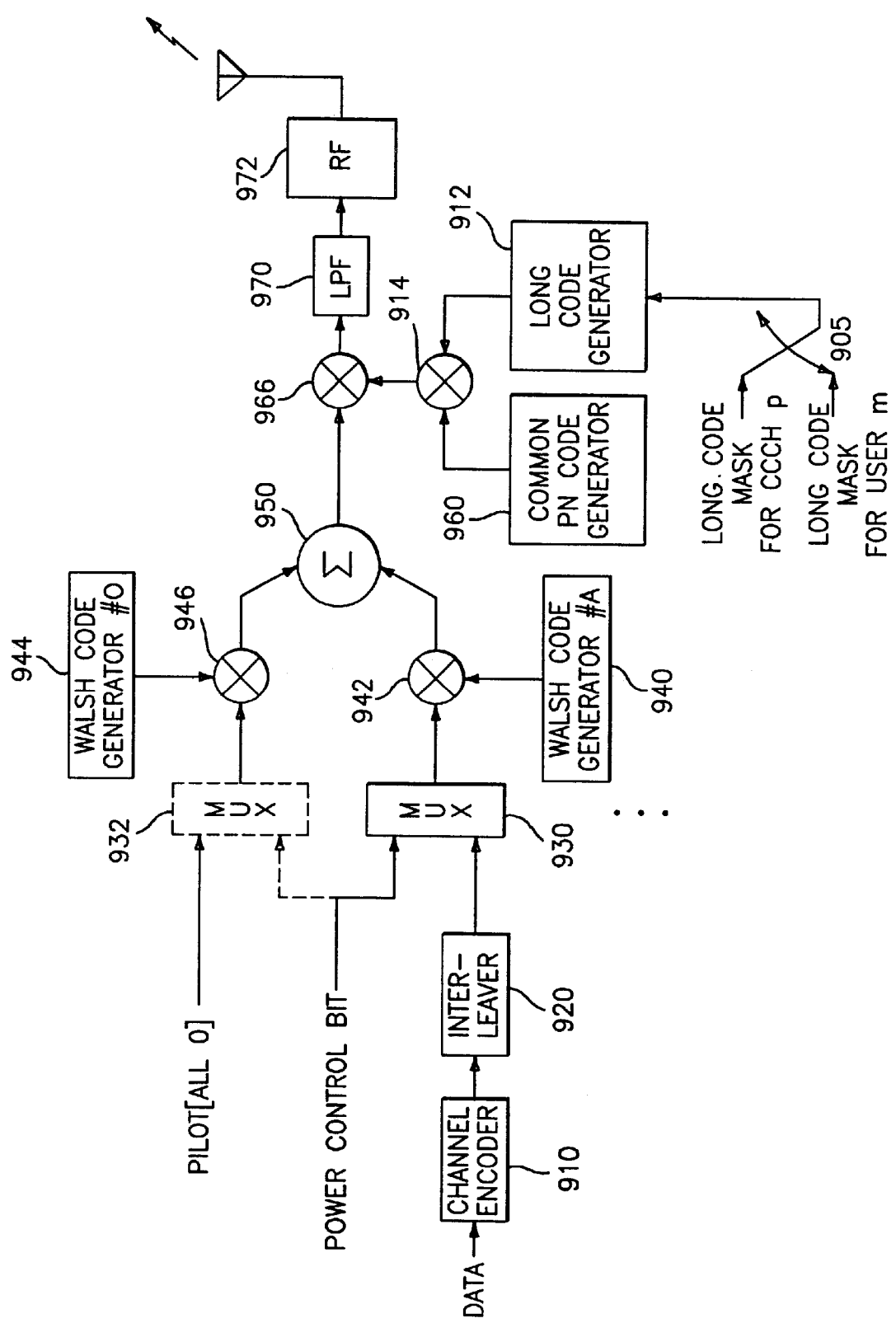
FIG. 9 is a block diagram of a transmitter in an MS according to the present invention.

FIG. 9 is a block diagram of an MS transmitter according to another embodiment of the present invention. Referring to FIG. 9, a channel encoder 910 detects and recovers errors in a communication channel. An interleaver 920 randomizes burst errors in the output of the channel encoder 910. A multiplexer 930 multiplexes the output of the interleaver 920 and a power control bit which is sent to control the transmit power of a BS. The multiplexing can be implemented in two ways: time division multiplexing, and puncturing and power control bit insertion. The insertion location of the power control bit may be preset by a mobile communication system or randomly determined.

A Walsh code #a generator 940 is a type of orthogonal code generator for orthogonal channelization among reverse channels and generates a Walsh code symbol #a of a Walsh code set. A mixer 942 multiplies the outputs of the multiplexer 930 and the Walsh code #a generator 940, for orthogonal modulation. A Walsh code #0 generator 944 generates a Walsh code symbol #0 for a pilot channel in the Walsh code set. A mixer 946 multiplies the output of the Walsh code #0 generator 944 by a predetermined value (+1 in the present invention) to thereby produce a reverse pilot channel for a receiver to use for channel estimation. A second multiplexer 932 may be used to multiplex the power control bit on the pilot channel. In this case, the multiplexer 930 is omitted and the output of the interleaver 920 is directly applied to the input of the mixer 942. An adder 950 adds the outputs of the mixers 942 and 946. A common PN code generator 960 generates a PN sequence assigned to a cell to identify the cell.

A selector 905 selects a different long code mask according to a reverse common channel and a reverse dedicated channel. A long code generator 912 generates a long code with the selected long code mask. A mixer 914 generates a spreading sequence used to spread the output of the mixer 966 by multiplying the outputs of the common PN code generator 960 and the long code generator 912. The output of the mixer 966 is transmitted through an LPF 970, an RF transmitting end 972, and a transmission antenna.

Figure 10:
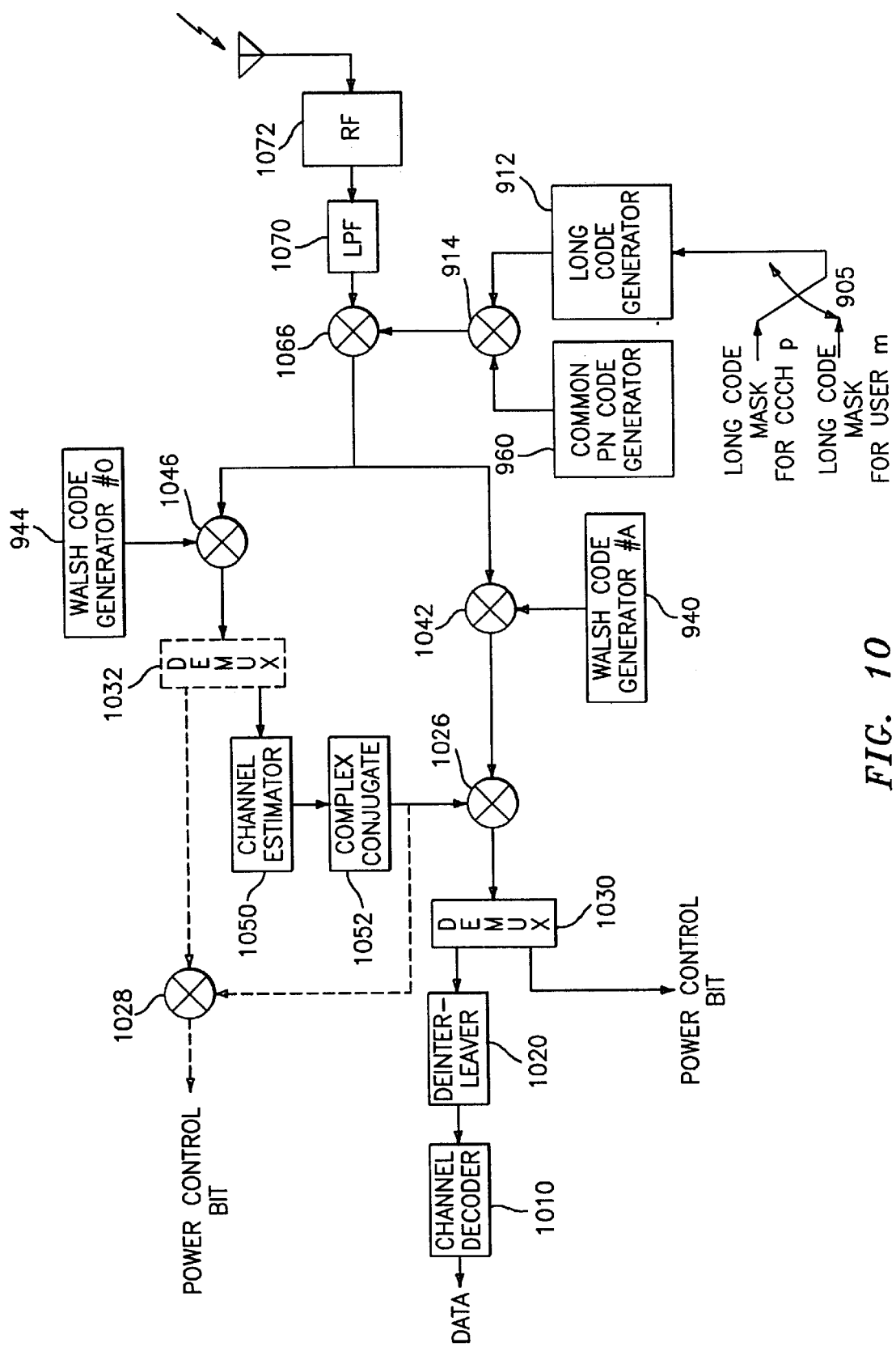
FIG. 10 is a block diagram of a receiver in a BS, corresponding to the transmitter of FIG. 9.

FIG. 10 is a block diagram of a BS receiver corresponding to the MS transmitter of FIG. 9. Referring to FIG. 10, a mixer 1066 receives a signal through a reception antenna, an RF receiving end 1072, and an LPF 1070. The selector 905 selects the same long code mask used in the transmitter. The long code generator 912 generates a long code utilizing the selected long code mask. The mixer 914 generates a sequence for despreading the output of the mixer 1066 by multiplying the outputs of the common PN code generator 960 and the long code generator 912.

A mixer 1046 multiplies the output of the mixer 1066 by the output of the Walsh code #0 generator 944 in order to extract the pilot channel for channel estimation. A demultiplexer 1032 is used when a power control bit is received on the pilot channel in which case a demultiplexer 1030 is not used. A channel estimator 1050 estimates a channel with the extracted pilot channel. A complex conjugator 1052 produces the complex conjugate of the channel estimated value. A mixer 1042 multiplies the output of the mixer 1066 by the Walsh code symbol #a used in the MS, thereby extracting the information transmitted to the BS. A mixer 1026 multiplies the complex conjugate by the output of the mixer 1042, for coherent demodulation. The demultiplexer 1030 demultiplexes the coherent demodulation signal into the power control bit and the data received from the MS. When the power control bit is loaded on the reverse pilot channel, the demultiplexer 1030 is omitted and the output of the mixer 1026 is directly applied to the input of a deinterleaver 1020. The deinterleaver 1020 deinterleaves the data received from the demultiplexer 1030 and a channel decoder 1010 channel-decodes the deinterleaved signal.

Figure 3A:
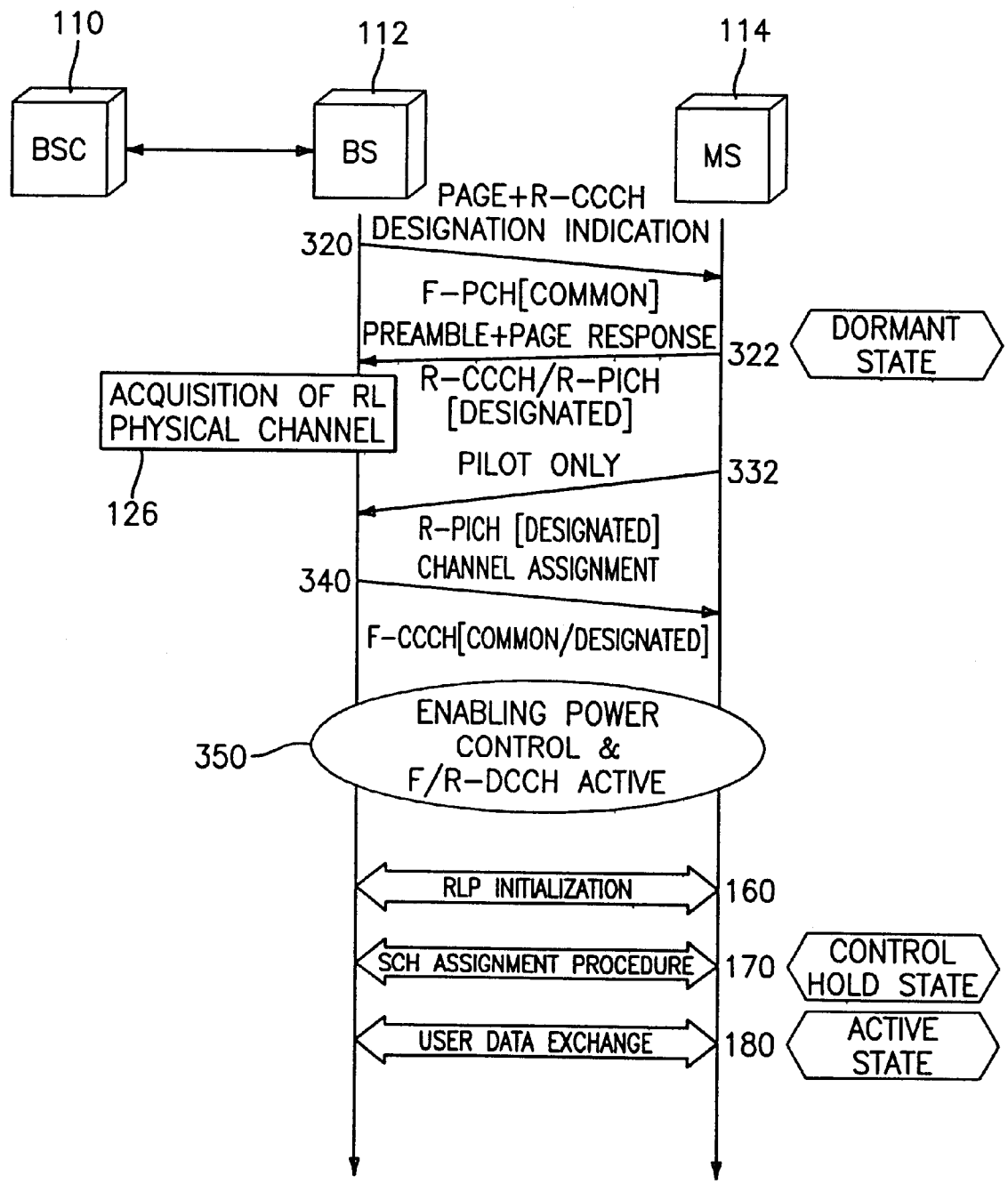
FIGS. 3A, 3B, and 3C are flowcharts depicting embodiments of data service resuming procedures between a BS and an MS in a dormant state for call initiation by the BS according to embodiments of the present invention.

Referring now to FIG. 3A, FIG. 3A is a flowchart illustrating signal flow between a BS and an MS in an embodiment of a data service resuming procedure when a BS initiates a call in a dormant state according to the present invention. The BS 112 sends the MS 114 a forward control message including information about designation of an R-CCCH as dedicated on an F-PCH which is a forward common channel (step 320). The MS 114 sends the BS 112 a response message on an R-CCCH designated as dedicated based on the forward control message (step 322). The response message may include information about designation of an F-CCCH as dedicated. Then, the BS 112 synchronizes its timing with the reverse link via the R-CCCH designated as dedicated (step 126). An R-PICH for channel estimation is maintained even if no common control channel message (step 332) exists. This obviates the need for sending a preamble by the MS to allow the BS to reacquire a PN sequence used for PN spreading in the MS. The BS 112 sends the MS 114 a channel assignment message on an F-CCCH (step 340). The F-CCCH can be designated as dedicated upon request from the MS 114 in one of two methods as described below.

Where there is loss of orthogonality on a forward link and no transmission delay of a channel assignment message. In this method, an F-CCCH can be spread by a particular PN sequence generated by the dedicated PN code generator 762 of FIG. 7. In such a case forward channel orthogonality is lost only during channel assignment message transmission. Therefore, the BS 112 notifies the MS 114 of an orthogonal code to be used by the channel assignment message (step 340). Then, the selector 764 of FIGS. 7 and 8 selects the common PN code generator 760 in the BS 112 and the MS 114 and the Walsh code #A generator 740 is set depending on the assigned orthogonal code.

Where there is no loss of forward channel orthogonality, a message is sent to the MS 114 only in a slot assigned to the MS since an F-CCCH is used in time division. Thus, the channel assignment message cannot be directly sent to the MS 114 when it is generated. The selector 705 of FIG. 7 selects a long code mask unique to the MS 114 and the mixer 724 scrambles data with a long code generated by the long code mask, so that an MS which does not use the long code mask detects errors in a CRC (Cyclic Redundancy Code) check following channel decoding. The BS 112 notifies the MS 114 of an orthogonal code to be used by the channel assignment message (step 340). Then, the selector 705 of FIGS. 7 and 8 in the BS 112 and the MS 114 selects a long code mask unique to the MS 114 and the Walsh code #A generator 740 is set depending on the assigned orthogonal code.

Since the assignment of bidirectional DCCHs enables a power control (step 350), the conventional problem of excessive power consumption, unnecessary transmission of a preamble and null traffic, and BS reacquisition which are caused by message communication on CCCHs can be overcome. Therefore, an F-DCCH and an R-DCCH are activated in a short time relative to the prior art, thereby enabling a rapid data transmission. The subsequent procedure (steps 160, 170, and 180) is performed in the same manner as FIG. 1.

In resuming a data service for a call initiated by a BS in a suspended state, step 160 can be omitted in the above procedure.

Figure 3B:
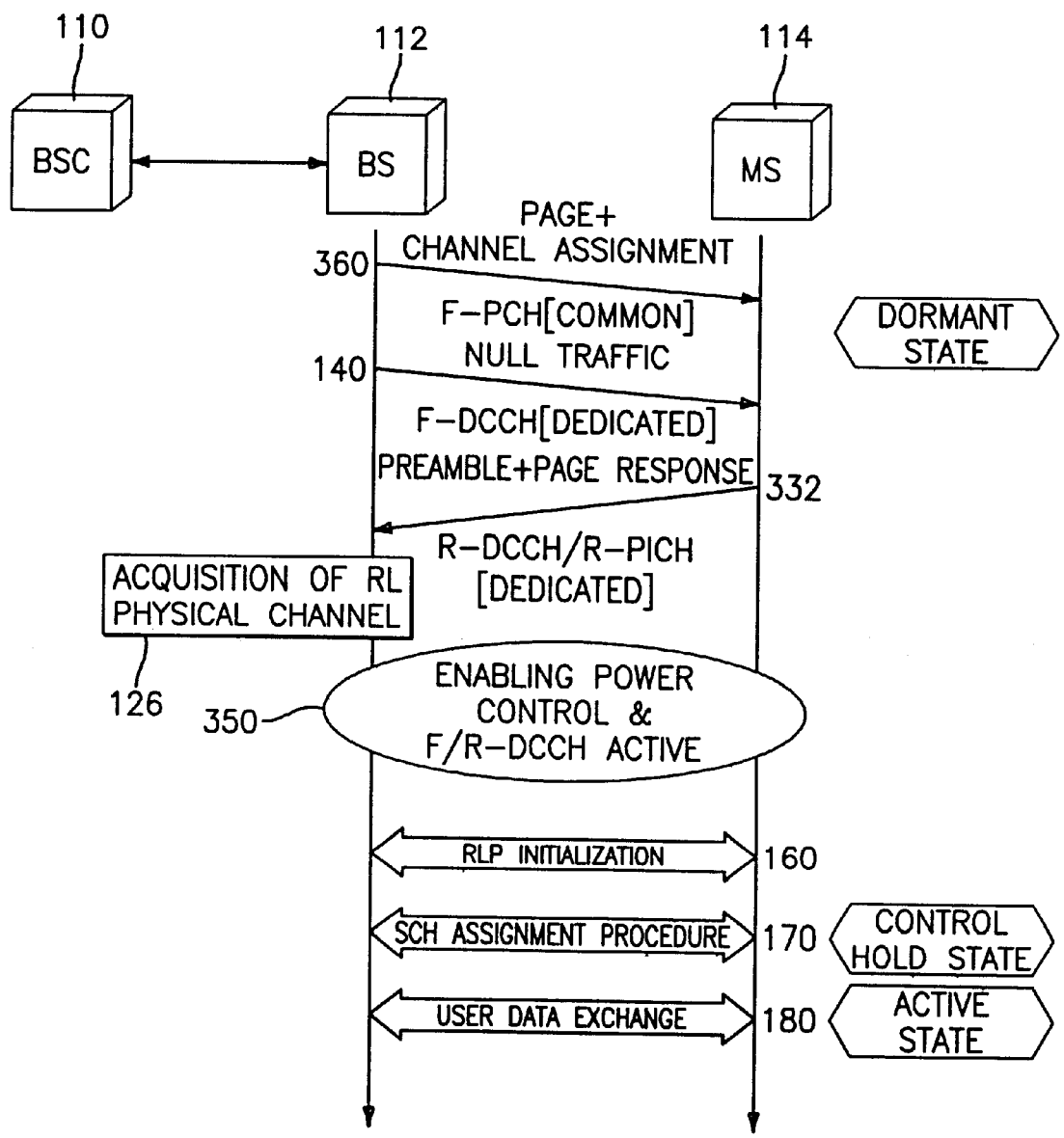

FIG. 3B is a flowchart depicting another embodiment of the data service resuming procedure for a call initiated by a BS in a dormant state. Referring to FIG. 3B, the BS 112 sends the MS 114 a forward control message for resuming a data service on an F-PCH which is a forward common channel (step 360). The forward control message includes information about assignment of bidirectional dedicated channels. The BS 112 sends null traffic on the assigned F-DCCH (step 140). The MS 114, which has received the forward control message and the channel assignment message, analyzes the null traffic (step 322). Then, the MS 114 sends the BS 112 a response message on the assigned R-DCCH. Prior to transmission of the response message, the MS 114 sends a preamble for a predetermined time period at a power level required to facilitate synchronization acquisition in the BS 112, and then the response message is sent on an R-DCCH in parallel with a reverse dedicated pilot channel. The BS 112 synchronizes its timing with the reverse link via the R-DCCH (step 126). Since the assignment of bidirectional DCCHs enables a power control (step 350), the conventional problem of excessive power consumption, unnecessary transmission of a preamble and null traffic, and BS reacquisition which are caused by message communication on CCCHs can be overcome. Therefore, the F-DCCH and the R-DCCH are activated in a short time relative to the prior art, thereby enabling a rapid data transmission. The subsequent procedure (steps 160, 170, and 180) is performed in the same manner as FIG. 1.

In resuming a data service for a call initiated by a BS in a suspended state, step 160 can be omitted in the above procedure.

Figure 3C:
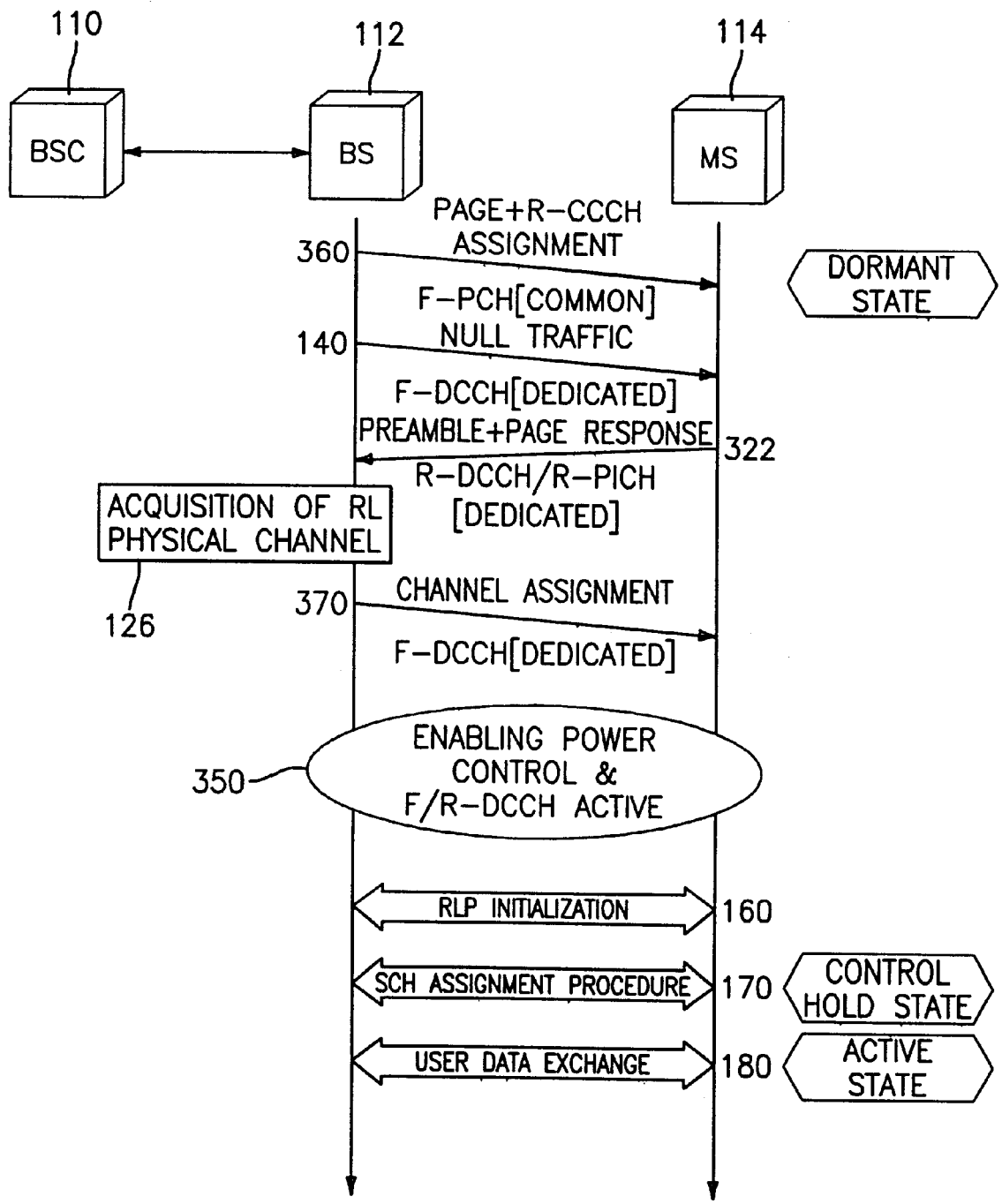

FIG. 3C is a flowchart depicting a further embodiment of the data service resuming procedure for a call initiated by a BS in a dormant state. Referring to FIG. 3C, the BS 112 sends the MS 114 a forward control message for resuming a data service on an F-PCH which is a forward common channel (step 360). The forward control message includes information about assignment of bidirectional dedicated channels. The BS 112 sends null traffic on the assigned F-DCCH (step 140). The MS 114, which has received the forward control message and the channel assignment message, analyzes the null traffic (step 322). Then, the MS 114 sends the BS 112 a response message on the assigned R-DCCH. Prior to transmission of the response message, the MS 114 sends a preamble for a predetermined time period at a power level required to facilitate synchronization acquisition in the BS 112, and then the response message is sent on an R-DCCH in parallel with a reverse dedicated pilot channel. The BS 112 synchronizes its timing with the reverse link via the R-DCCH (step 126). The BS 112 can proceed to a channel reassignment on the F-DCCH (step 370).

Since the assignment of bidirectional DCCHs enables a power control (step 350), the conventional problem of excessive power consumption, unnecessary transmission of a preamble and null traffic, and BS reacquisition which are caused by message communication on CCCHs can be overcome. Therefore, the F-DCCH and the R-DCCH are activated in less time when compared to the prior art, thereby enabling a rapid data transmission. The subsequent procedure (steps 160, 170, and 180) is performed in the same manner as FIG. 1.

In resuming a data service for a call initiated by a BS in a suspended state, step 160 can be omitted in the above procedure.

Figure 4:
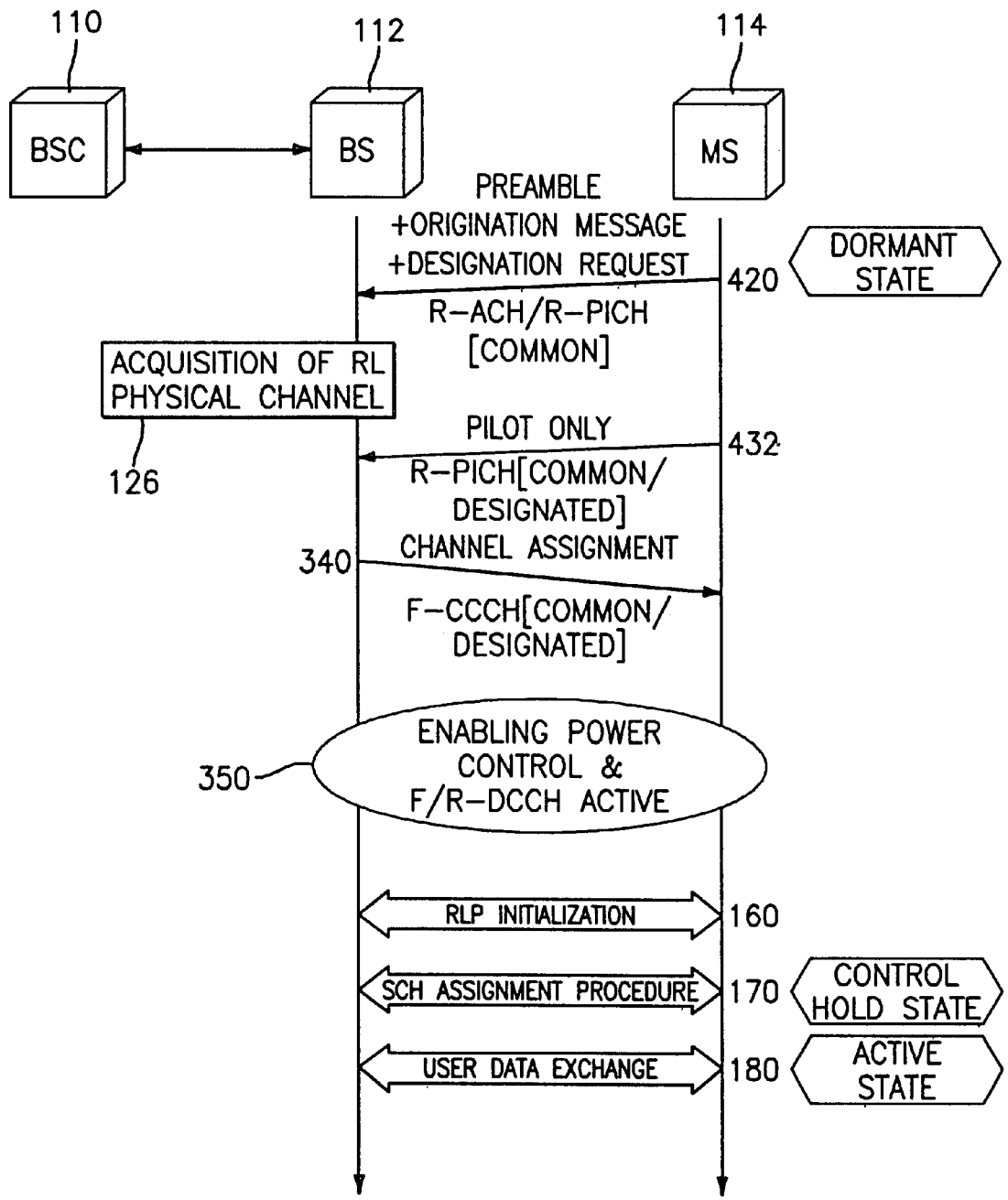
FIG. 4 is a flowchart depicting an embodiment of a data service resuming procedure between a BS and an MS in a dormant state in the case of a call initiation by the MS according to a fourth embodiment of the present invention.

FIG. 4 is a flowchart depicting an embodiment of a data service resuming operation for a call initiated by an MS in a dormant state. Referring to FIG. 4, the MS 114 sends a reverse control message to the BS 112 for resuming a data service on an R-ACH (step 420). The control message may include information about designation of an F-CCCH as dedicated. Then, the BS 112 synchronizes its timing with the reverse link via the R-ACH (step 126). An R-PICH for channel estimation is maintained even if there exists no common control channel message (step 432). This obviates the need for the subsequent step of sending a preamble by the MS to allow the BS to reacquire a PN sequence used for PN spreading in the MS. The R-PICH is spread by a PN sequence for the R-CCCH for a predetermined time and then by a PN sequence for an R-DCCH. The BS 112 sends the MS 114 a channel assignment message on an F-CCCH (step 340). The F-CCCH can be designated as dedicated upon request from the MS 114.

Figure 2:
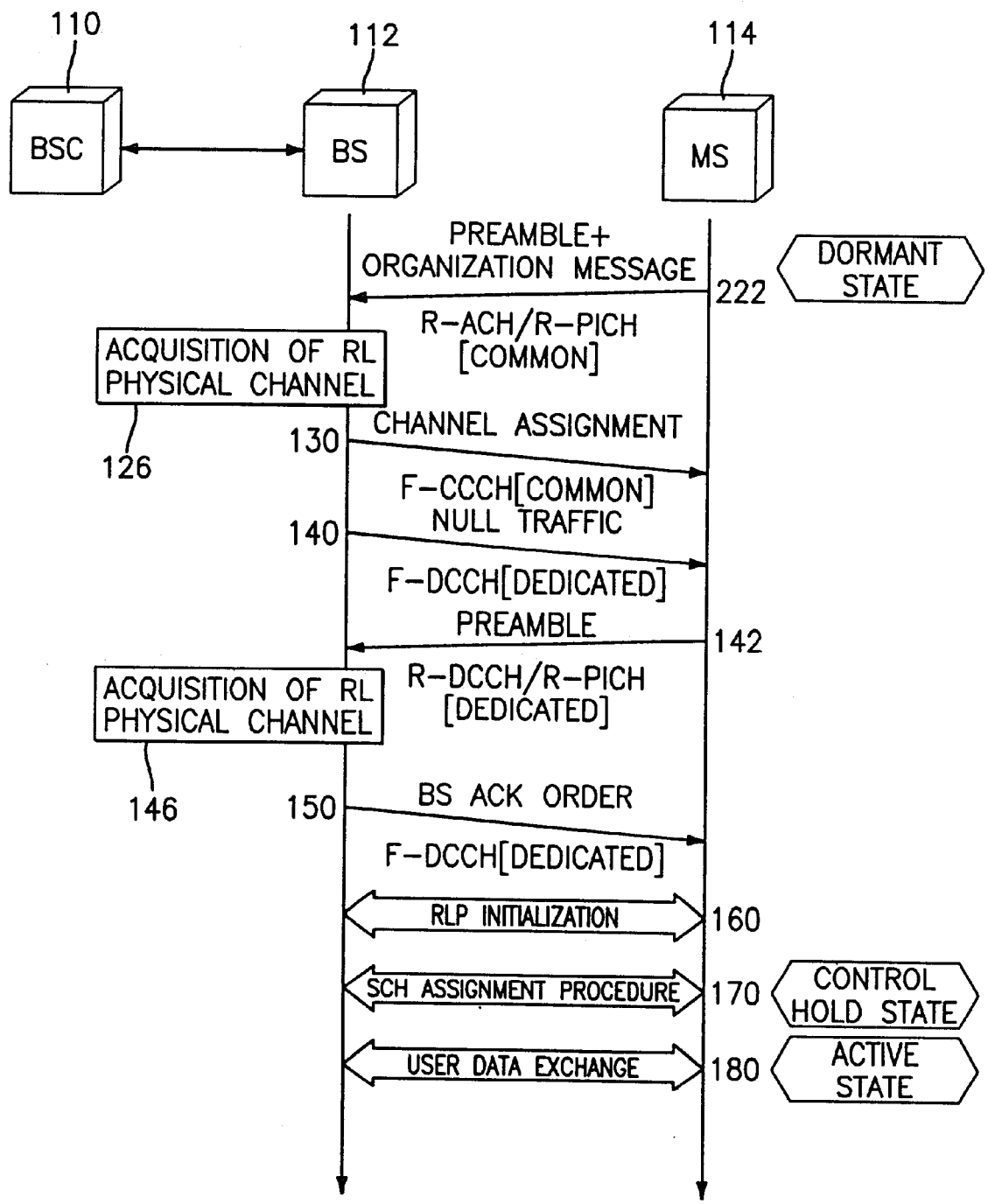
FIG. 2 is a flowchart depicting a conventional data service resuming procedure between a BS and a MS in a dormant state for call initiation by the MS.

Since the assignment of bidirectional DCCHs enables a power control (step 350), the conventional disadvantages of excessive power consumption, unnecessary transmission of a preamble and null traffic, and BS reacquisition which are caused by message communication on CCCHs can be overcome. Therefore, an F-DCCH and an R-DCCH are activated in less time when compared to the prior art, thereby enabling a rapid data transmission. The subsequent procedure (steps 160, 170, and 180) is performed in the same manner as FIG. 2.

In resuming a data service for a call initiated by an MS in a suspended state, step 160 can be omitted in the above procedure.

Figure 5A:
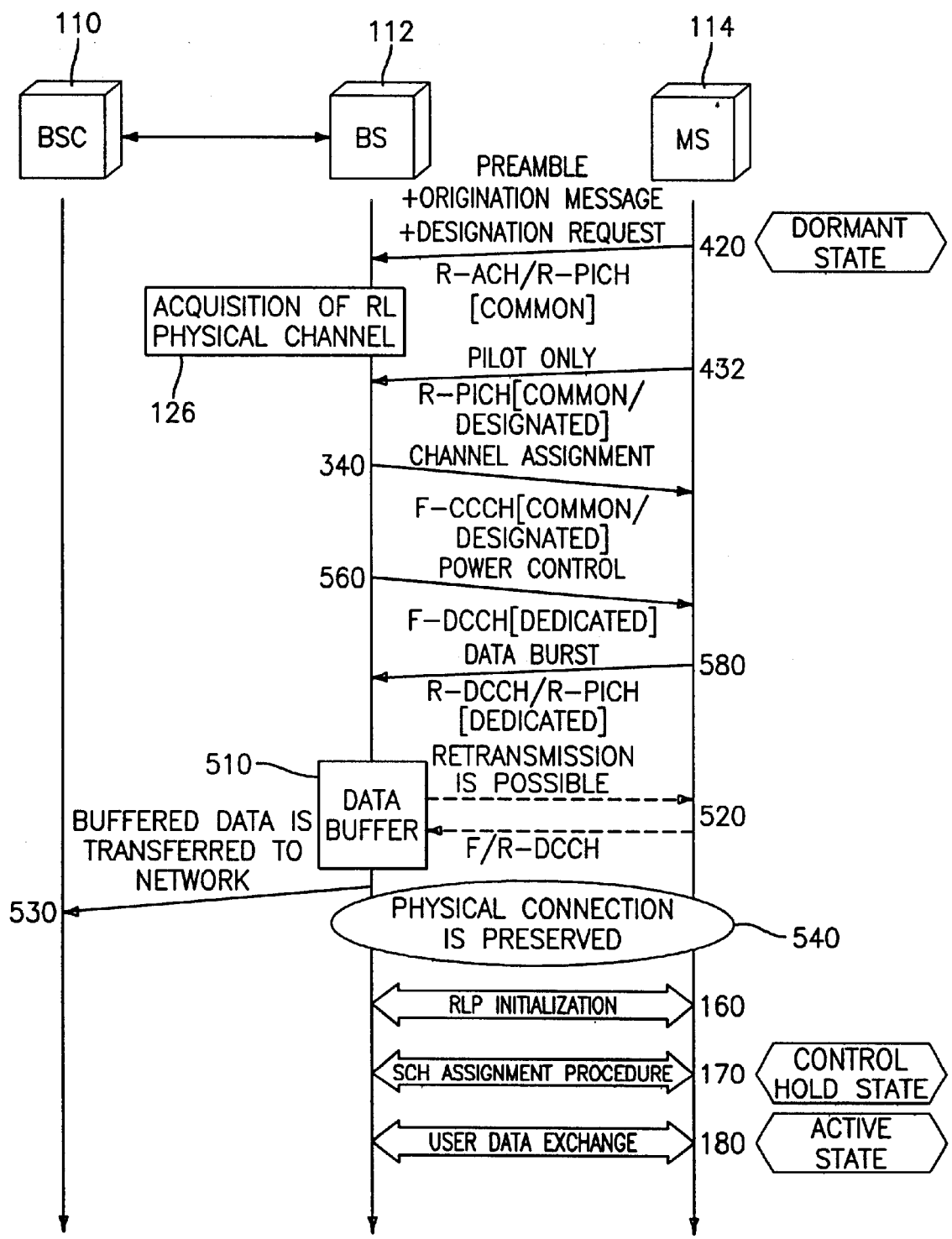
FIGS. 5A and 5B are flowcharts depicting other embodiments of the data service resuming procedure between a BS and an MS in a dormant state for call initiation by the MS according to a fifth embodiment of the present invention.

FIG. 5A is a flowchart depicting another embodiment of the data service resuming procedure for a call initiated by an MS in a dormant state, in which burst data generated by the MS is sent on an R-DCCH, that is, data is sent in the dormant state without entering a data transmission state by assigning a dedicated traffic channel. Referring to FIG. 5A, the MS 114 sends the BS 112 a reverse control message for resuming a data service on an R-CCCH (step 420). The control message may include information about designation of an F-CCCH as dedicated. Then, the BS 112 synchronizes its timing with the reverse link via the R-CCCH (step 126). An R-PICH for channel estimation is maintained even if there exists no common control channel message (step 432). This obviates the need for the subsequent step of sending a preamble by the MS to allow the BS to reacquire a PN sequence used for PN spreading in the MS. The R-PICH is spread by a PN sequence for the R-CCCH for a predetermined time and then by a PN sequence for an R-DCCH. The BS 112 sends the MS 114 a channel assignment message on an F-CCCH (step 340). The F-CCCH can be designated as dedicated upon request from the MS 114 in step 420. The BS 112 performs a power control for the reverse link via an F-DCCH assigned in step 340 (step 560). Then, the MS 114 sends the BS 112 data bursts on an R-DCCH (step 580). The data is stored in a buffer of the BS 112 (step 510). Frames having errors during the transmission are recovered through retransmission (step 520). The buffered data is transmitted to a network through a BSC 110 (step 530). If the amount of the received data exceeds the capacity of the buffer, the assigned DCCHs are maintained (step 540). The subsequent procedure (steps 160, 170, and 180) is performed in the same manner as FIG. 2.

In resuming a data service for a call initiated by an MS in a suspended state, step 160 can be omitted in the above procedure.

Figure 5B:
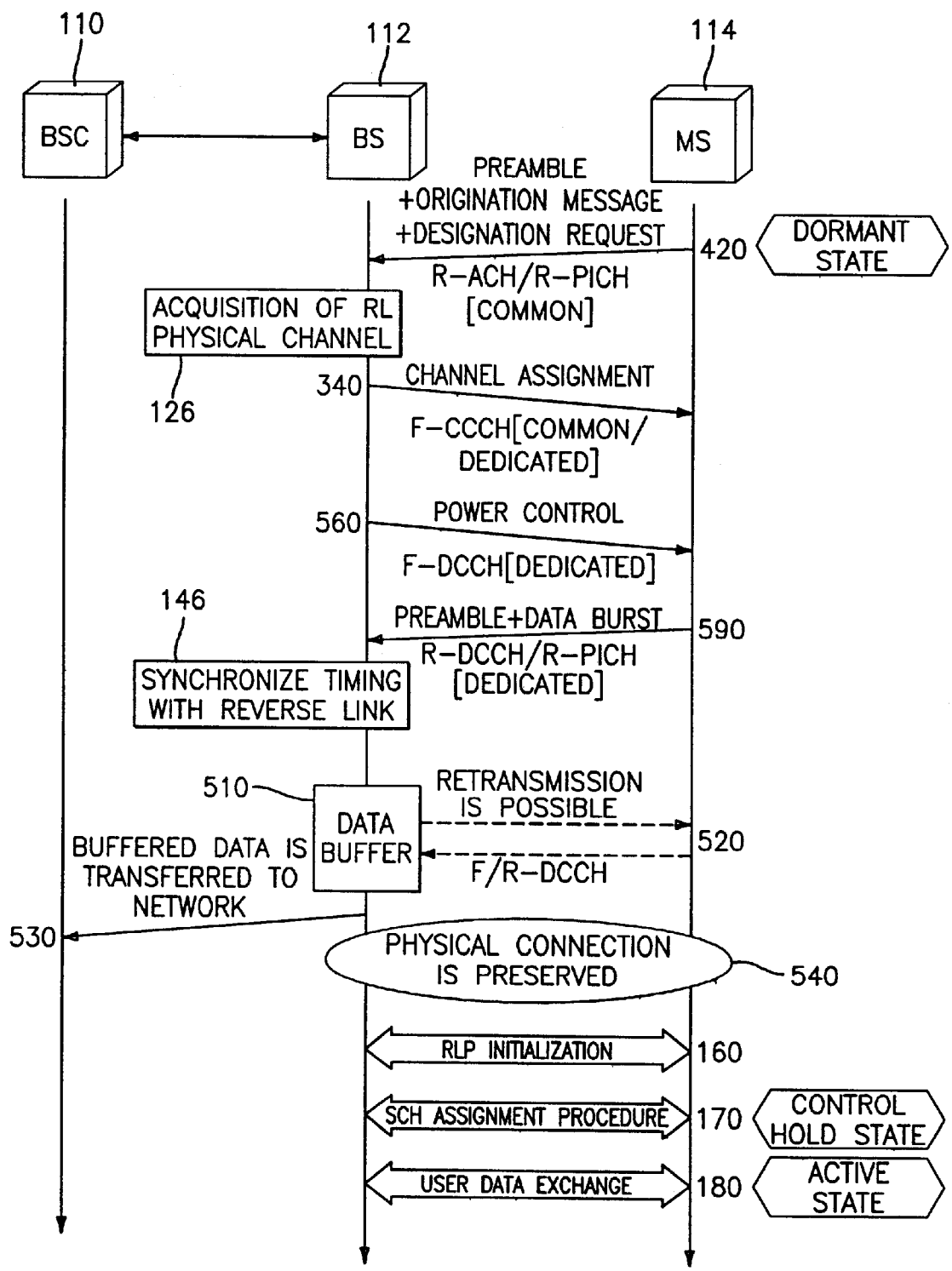
Figure 6:
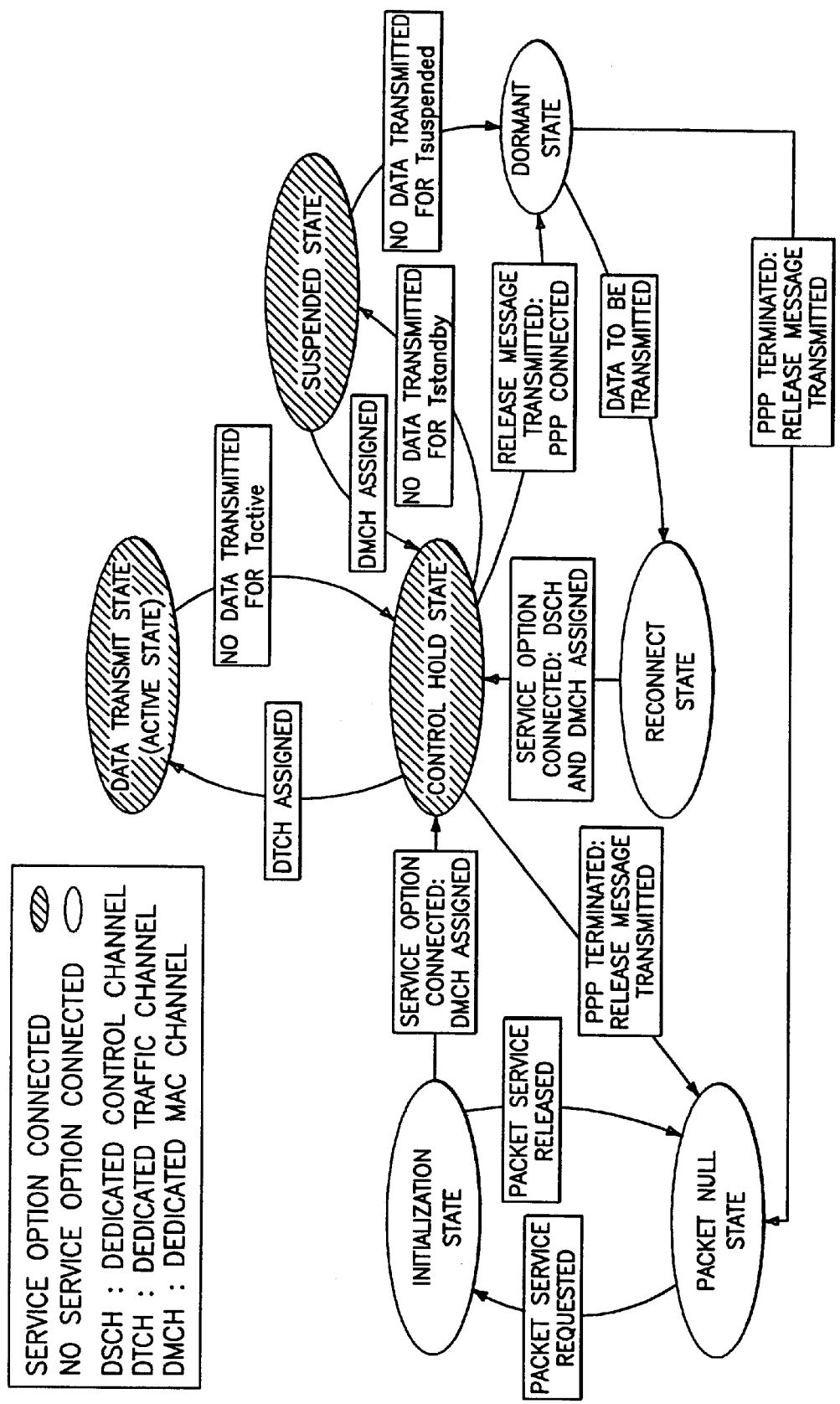
FIG. 6 is a state transition diagram for packet data service in accordance with the prior art.

FIG. 5B is a flowchart depicting a further embodiment of the data service resuming procedure for a call initiated by an MS in a dormant state, in which burst data generated by the MS is sent on an R-DCCH, that is, data is sent in the dormant state without entering a data transmission state by assigning a dedicated traffic channel. Referring to FIG. 5B, the MS 114 sends the BS 112 a reverse control message for resuming a data service on an R-CCCH (step 420). The control message may include information about designation of an F-CCCH as dedicated. Prior to transmission of the reverse control message, the MS 114 sends a preamble for a predetermined time period at a power level required to facilitate synchronization acquisition in the BS 112, and then the control message is sent on the R-CCCH in parallel with a reverse pilot channel. Then, the BS 112 synchronizes its timing with the reverse link via the R-CCCH (step 126). When no R-CCCH message exists, the reverse pilot channel is no longer sent after a predetermined time.

The BS 112 sends the MS 114 a channel assignment message on an F-CCCH (step 340). The F-CCCH can be designated as dedicated upon request from the MS 114 in step 420. The BS 112 performs a power control for the reverse link via an F-DCCH assigned in step 340 (step 560). Then, the MS 114 sends the BS 112 data bursts on an R-DCCH (step 590). More particularly, the MS 114 sends a preamble for a predetermined time period at a power level required to facilitate synchronization acquisition in the BS 112, and then the data bursts are sent on the R-DCCH in parallel with a reverse pilot channel. Then, the BS 112 synchronizes its timing with the reverse link via the R-DCCH (step 146). The data is stored in a buffer of the BS 112 (step 510). Frames having errors during the transmission are recovered through retransmission (step 520). The buffered data is transmitted to a network through a BSC 110 (step 530). If the amount of the received data exceeds the capacity of the buffer, the assigned DCCHs are maintained (step 540). The subsequent procedure (steps 160, 170, and 180) is performed in the same manner as FIG. 2.

In resuming a data service for a call initiated by an MS in a suspended state, step 160 can be omitted in the above procedure.

As described above, the present invention is advantageous in that resources are efficiently used and a rapid data service is supported because data transmission on a common channel is minimized and a data transmission state using a dedicated channel or a channel designated as dedicated is rapidly entered.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A transmitting device for a base station in a mobile communication system, comprising:

a common channel data generator for generating a common channel data frame to be transmitted;

a first mask for generating a first long code for a forward common channel;

a second mask for generating a second long code for a forward common channel to be designated as dedicated to a specific mobile station;

a selector for selecting one of the first and second long code masks generated in the first and second mask;

a long code generator for generating a long code with the selected long code mask from the selector;

a mixer for mixing the frame data received from the data generator and the long code received from the long code generator; and a transmitter for spreading a mixer output for transmission.

2. A transmitting device for a mobile station in a mobile communication system, comprising:

an orthogonal modulator for orthogonally modulating frame data to be transmitted;

a first mask for generating a first long code for a reverse common channel;

a second mask for generating a second long code for a reverse common channel to be designated as dedicated;

a selector for selecting one of the first and second long code masks in the first and second mask;

a long code generator for generating a long code with the selected long code mask;

a mixer for producing a spreading code by mixing a common PN code with the generated long code;

a spreader for multiplying the orthogonally modulated frame data by the spreading code; and a transmitter for upconverting the frequency of the output of the spreader, for transmission.

3. The transmitting device of claim 2, further comprising:

a pilot channel transmitter for spreading a reverse pilot channel signal to be transmitted simultaneously with the common channel message by the spreading code and continuously transmitting the spread reverse pilot channel signal; and wherein said reverse common channel is designated upon a call origination in a dedicated channel released state.

* * * * *

UNITED STATES PATENT AND TRADEMARK OFFICE
CERTIFICATE OF CORRECTION

PATENT NO.    : 6,442,152 B1
DATED         : August 27, 2002
INVENTOR(S)   : Su-Won Park et al.

It is certified that error appears in the above-identified patent and that said Letters Patent is hereby corrected as shown below:

<u>Title page,</u>
Item [75], "Doo-Gyun Kim" should be -- Dae-Gyun Kim --.

Signed and Sealed this

Thirty-first Day of December, 2002

JAMES E. ROGAN
*Director of the United States Patent and Trademark Office*